(12) United States Patent
Ferri et al.

(10) Patent No.: US 10,858,832 B2
(45) Date of Patent: Dec. 8, 2020

(54) STRUCTURAL ELEMENT FOR CONSTRUCTIONS

(71) Applicant: FSC TECHNOLOGIES LLC, Davenport, FL (US)

(72) Inventors: Giovanni Ferri, Solignano (IT); Claudio Subacchi, Davenport, FL (US)

(73) Assignee: FSC TECHNOLOGIES LLC, Davenport, FL (US)

( * ) Notice: Subject to any disclaimer, the term of this patent is extended or adjusted under 35 U.S.C. 154(b) by 0 days.

(21) Appl. No.: 16/150,008

(22) Filed: Oct. 2, 2018

(65) Prior Publication Data

US 2019/0112812 A1 Apr. 18, 2019

(30) Foreign Application Priority Data

Oct. 13, 2017 (IT) .................. 102017000115951

(51) Int. Cl.
| | |
|---|---|
| *E04C 5/07* | (2006.01) |
| *E04C 3/20* | (2006.01) |
| *E04C 3/26* | (2006.01) |
| *E04C 5/08* | (2006.01) |
| *E04C 3/06* | (2006.01) |

(52) U.S. Cl.
CPC .................. *E04C 3/20* (2013.01); *E04C 3/06* (2013.01); *E04C 3/26* (2013.01); *E04C 5/07* (2013.01); *E04C 5/085* (2013.01)

(58) Field of Classification Search
CPC ..... E04C 3/30; E04C 3/06; E04C 3/26; E04C 5/07; E04C 5/085; E04C 5/073; E04C 3/20

See application file for complete search history.

(56) References Cited

U.S. PATENT DOCUMENTS

| | | | |
|---|---|---|---|
| 3,145,502 A | 8/1964 | Rubenstein | |
| 3,798,867 A * | 3/1974 | Starling | ..................... E02D 5/64 52/834 |
| 4,019,301 A * | 4/1977 | Fox | ........................... E02D 5/60 52/834 |
| 5,644,890 A * | 7/1997 | Koo | .......................... E04B 5/43 52/223.1 |
| 6,219,986 B1* | 4/2001 | Ouchi | ................. E04G 23/0218 52/425 |
| 6,219,991 B1 | 4/2001 | Salek-Nejad | |
| 2006/0137115 A1* | 6/2006 | Park | .......................... E01D 2/02 14/74.5 |

(Continued)

FOREIGN PATENT DOCUMENTS

| | | |
|---|---|---|
| CN | 102900200 A | 1/2013 |
| CN | 103591393 A | 2/2014 |

(Continued)

OTHER PUBLICATIONS

Translation of Go (JP 2004211290) provided by espacenet.com at: http://translationportal.epo.org/emtp/translate/?ACTION=description-retrieval&COUNTRY=JP&ENGINE=google&FORMAT=docdb&KIND=A&LOCALE=en_EP&NUMBER=2004211290&OPS=ops.epo.org/3.2&SRCLANG=ja&TRGLANG=en.*

*Primary Examiner* — Beth A Stephan
(74) *Attorney, Agent, or Firm* — Pearne & Gordon LLP

(57) ABSTRACT

A structural element for constructions comprising a structure (2) made of concrete and/or geopolymer and/or alkali activated material and at least one strip (3) made of a fibre-resin composite.

Such strip surrounds at least part of said structure (2), compressing it. The strip also at least partly surmounts an external surface (20) of said structure (2).

7 Claims, 2 Drawing Sheets

(56) References Cited

U.S. PATENT DOCUMENTS

| | | | |
|---|---|---|---|
| 2012/0311957 A1* | 12/2012 | Wu | E04G 23/0218 52/698 |
| 2014/0318057 A1* | 10/2014 | Zhao | E04C 5/07 52/223.14 |
| 2015/0076728 A1* | 3/2015 | Mathieu | B29C 39/42 264/72 |
| 2016/0130813 A1* | 5/2016 | Al-Salloum | E04C 3/34 52/309.2 |
| 2016/0145882 A1* | 5/2016 | Ehsani | E04G 23/0218 52/741.3 |
| 2016/0340556 A1* | 11/2016 | Watanabe | C09J 7/048 |
| 2018/0187439 A1* | 7/2018 | Oliveira De Barros | E04G 23/0218 |
| 2019/0010700 A1* | 1/2019 | Webb | E04G 3/20 |
| 2019/0153728 A1* | 5/2019 | Kim | E04G 2/06 |
| 2019/0177992 A1* | 6/2019 | Saadatmanesh | E04C 3/34 |
| 2019/0368215 A1* | 12/2019 | Roberts | E06B 1/02 |

FOREIGN PATENT DOCUMENTS

| | | |
|---|---|---|
| JP | H07139090 A | 5/1995 |
| JP | 3947463 A | 7/2004 |
| JP | 2004211290 A | 7/2004 |

\* cited by examiner

STRUCTURAL ELEMENT FOR CONSTRUCTIONS

The present invention relates to a structural element for constructions, for example in the building or infrastructural (bridges, flyovers, etc.) field.

As is known, concrete has excellent resistance to compression but a very poor resistance to traction.

To obviate this drawback, in the prior art it is known to apply a pre-compression load in those zones of the concrete which during use are subjected to traction due to the weight thereof or due to external loads.

In the light of this, low-sliding steel tension rods are placed in traction inside a mould which is then filled with concrete. Thereafter, the tension rods are released and consequently the compression load of the tension rods is transferred to the concrete product.

However, this solution is not free from drawbacks:
- the transfer of the load between the tension rods and the concrete is achieved through the adhesion of the tension rods to the concrete; when a high compression of the concrete is required, stranded wires (having a plurality of wires wound in a spiral fashion) are used as tension rods; this introduces bending loads; further, the specific steel-concrete pressure can become high and impose constraints on the possibility of using light concretes which would have considerable benefits for the bending-stressed elements;
- the concrete has a certain tendency to shrinkage during the steps of setting and curing; this means that a certain percentage of the load imposed on the tension rods is lost as the structural element tends to shorten;
- the metal tension rods must be protected from corrosion and as a consequence they must be positioned sufficiently internally with respect to the external surface of the products; all the concrete positioned between the tension rods and the lower external surface has the effect of making the structure heavier, but does not collaborate at the structural level;
- in structures requiring a certain level of fire resistance, it is necessary to increase the distance between the lower surface of the concrete elements and the pre-compression tension rods, as the relaxation by viscous sliding of the steel becomes significant even with relatively modest increases in temperature;
- the use of pre-compression tension rods is normally an operation that is not susceptible to a high degree of automation, and is labour-intensive. This starts from the laying steps of the tension rods and continues up to the finishing steps of the product.

Another known solution instead requires the positioning of the tension rods in special sheaths inside the mould. Following the curing of the concrete the tension rods located internally of the sheaths are placed under traction.

This solution has the advantage of being less sensitive to shrinkage than concrete as the tension rods are not in direct contact with the concrete (since they can slide inside the sheath). This process however requires a long working time, labour and costs, so that it is used much less often and for structures of significant dimensions.

In this context, the technical task underpinning the present invention is to propose a structural element and a method for improving structural resistance, which element and method obviate the drawbacks of the cited prior art.

In particular, one object of the present invention is to provide a structural element and a method for improving structural resistance which enable costs to be contained while at the same time increasing the resistance characteristics to external agents.

The technical task set and the objects specified are substantially attained by a structural element and a method for improving structural resistance, comprising the technical characteristics as set out in one or more of the accompanying claims.

Further characteristics and advantages of the present invention will become more apparent from the indicative and thus non-limiting description of a preferred, but not exclusive, embodiment of a structural element, as illustrated in the accompanying drawings, in which.

Figure 1:
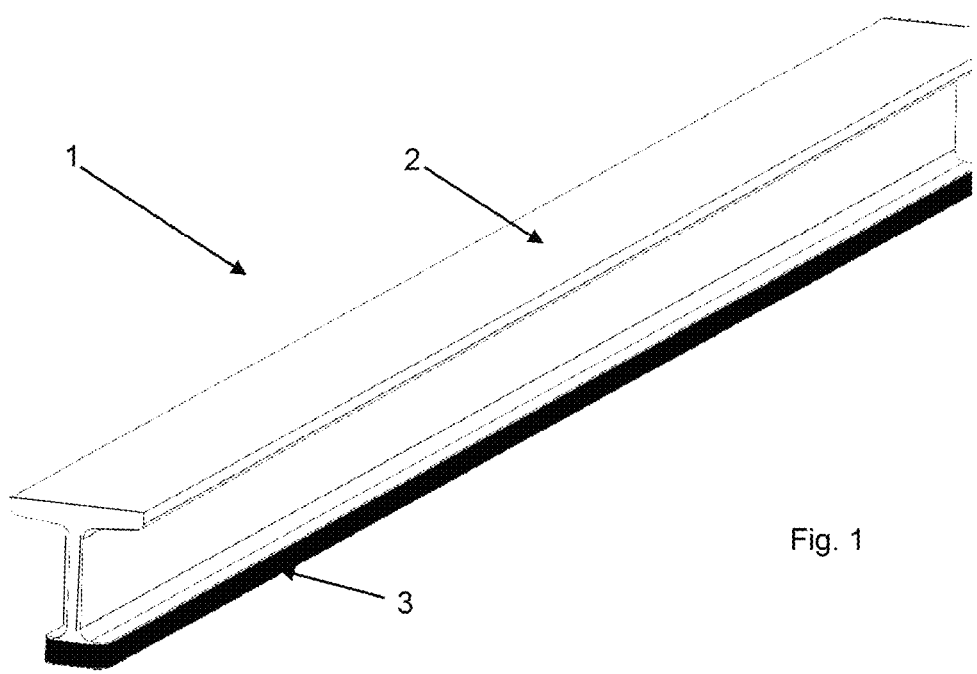
FIG. 1 is a perspective view of a structural element according to the present invention.
Figure 2:
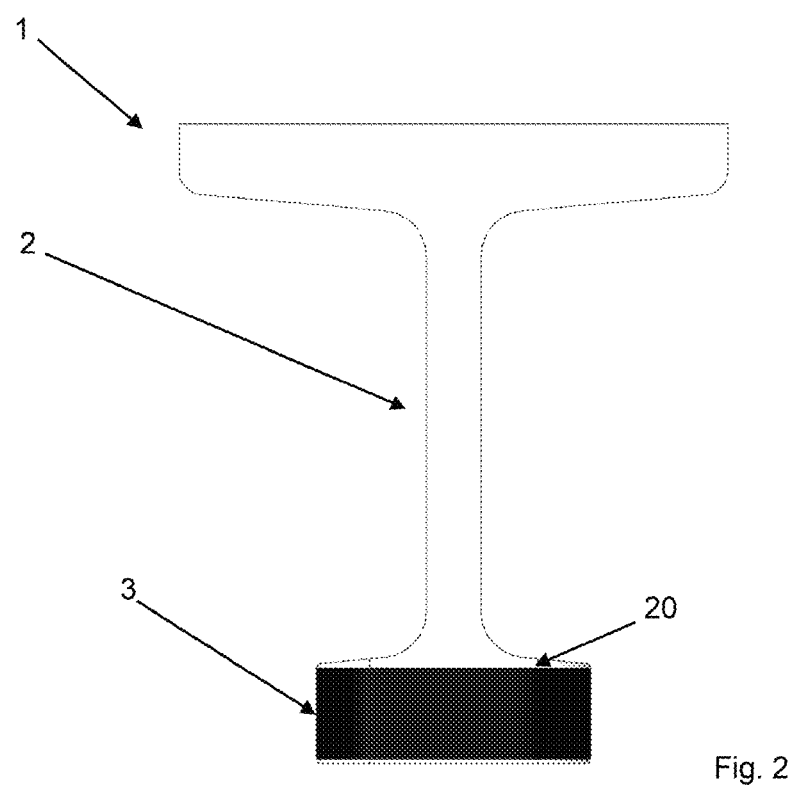
FIG. 2 is a cross-section view of the structural element of FIG. 1.

A structural element for constructions is denoted in the attached figures by reference number 1.

The element 1 comprises a structure 2 made of concrete and/or geopolymer and/or alkali activated material. These materials are well known in the technical field and are therefore not described further herein. In particular, alkali activated material can refer to any bonding system derived from the reaction of an alkaline metallic source (solid or in powder form) with a solid silicate powder. As shown by way of example in the appended figures, the structure 2 might comprise/be a beam. It is possible for the structure 2 to comprise an internal core, for example made of metal.

The structure 2 comprises at least one strip 3 made of a fibre-resin composite.

In the preferred solution the fibre is a glass fibre or a carbon fibre or a basalt fibre. The fibres are advantageously inert against corrosion and chemical attacks, so that the durability of the elements is enormously increased.

The resin can for example be a polyester, vinyl ester, epoxy, polyurethane resin.

The fibre comprises a plurality of filaments. The filaments advantageously extend flanked to one another. The filaments are preferably not intertwined to form a warp and a weft. The resin enables an optimal distribution of the load among the filaments.

The strip 3 surrounds at least part of said structure 2, compressing it. The strip 3 winds about itself, following a closed line. The strip 3 can advantageously involve the lower part of the structure 2.

Further, the strip 3 at least partly surmounts an external surface 20 of said structure 2. The term "surmount" and the term "superpose" throughout the present description are intended to mean that one element at least partly covers another element, not that it is above the other element. Compression is therefore made externally of the structure 2 and consequently a large portion of the material constituting it cooperates with the load.

The strip 3 comprises two flaps 21 which surmount one another and which adhere by gluing. The gluing can be determined by application of additional glue. Alternatively it can also derive only from the interaction between the two superposed flaps 21 of fibre-resin composite material. The two flaps 21 might also possibly adhere only by friction. Elements external to the blocking strip 3 of the two flaps 21 are advantageously absent. The strip comprises a plurality of superposed layers 30 made of fibre-resin composite which surround the structure 2.

The layers 30 are superposed on one another, a more external layer being glued to the more internal layer without external means for maintaining a tension of said strip 30.

The fibre-resin composite defines a barrier having a low permeability to water. This is important as it enables protecting those areas which experience micro-cracking and consequent corrosion of the steel armatures and which can be attacked by water contaminated by corrosive elements (chlorine present in the salts used for prevention of ice-forming, brackish water, etc.).

Where an even more significant impermeabilisation is required, the structural element 1 can comprise one or more sheets 4 of an organic polymer interposed between two superposed zones of said strip 3 for improving impermeabilisation to water.

Figure 3:
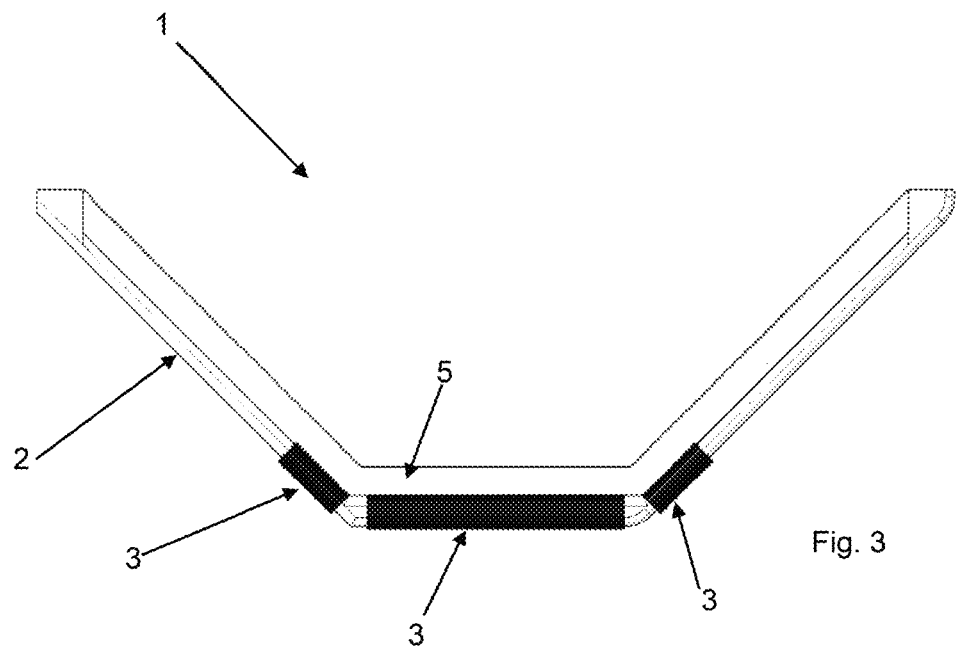
FIG. 3 is a section view of a further structural element.
Figure 4:
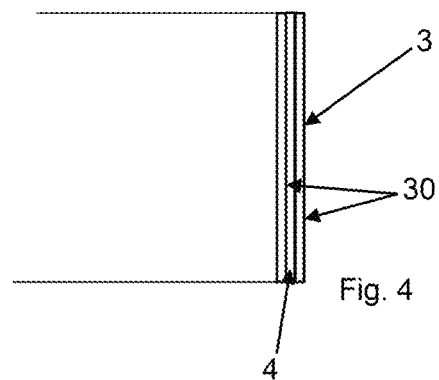
FIGS. 4 and 5 show details of structural elements according to the present invention.
Figure 5:
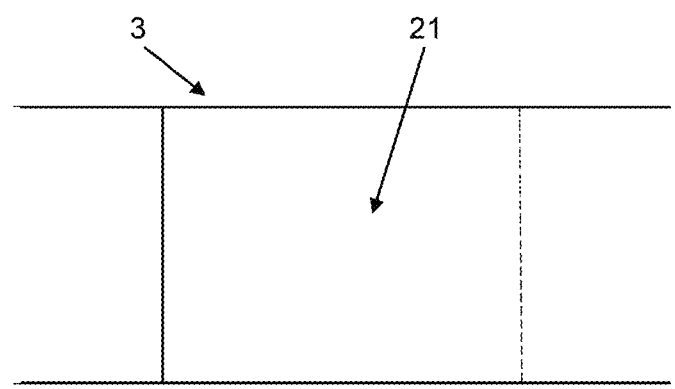

As shown by way of example in FIG. 3, three distinct strips 3 are used, which surround corresponding parts of the concrete structure 2. FIG. 3 advantageously illustrates a cladding 5 located on the structure 2.

A further object of the present invention is a method for improving a structural resistance of a structure 2 made of concrete and/or geopolymer and/or alkali activated material (also known as AAM).

The method comprises a step of applying a strip 3 made of a fibre-resin composite to the structure 2. As indicated in the foregoing, the fibre is preferably a glass fibre or a carbon fibre or a basalt fibre.

The fibre advantageously comprises a plurality of filaments. The step of applying the strip 3 includes surrounding at least part of the structure 2 with the strip 3. This also includes superposing said strip 3 at least in part on an external surface 20 of the structure 2. The step of applying the strip 3 advantageously includes extending the strip 3 by means of a suitable mechanical arm.

The step of applying the strip 3 to the structure 2 takes place after the curing of the structure 2 has terminated. The step of applying the strip 3 therefore includes a post-compression of the structure 2 (meaning the structure 2 first cures and is then compressed from outside).

The strip 3 keeps the part of the structure 2 it surrounds compressed.

The step of surrounding at least part of the structure 2 advantageously comprises superposing at least two end flaps of the strip 3 (the flaps can be retained by gluing or simply by friction). The strip 3 can possibly define a plurality of layers 30 which annularly envelop the structure 2.

In a first solution, the step of surrounding said structure 2 with said strip 3 comprises a step of compressing said structure 2. Thus the step of compression is performed at the same time as the application of the strip 3. In this case the strip 3 is thus applied tensioned.

In an alternative solution the structure 2 is mechanically compressed before application of the strip 3. Subsequently the strip 4 is applied, which in this case might be done by applying it at a lower or nil tension (it is therefore applied less tensioned than in the preceding solution even though the structure 2 will in any case be compressed).

The present invention provides important advantages.

The compression on the outside is such that almost all the material of the structure 2 cooperates with the load. Further lightened concretes can be used as the high-specific pressure zones that are generate along the tension rod-concrete contacts are eliminated. Further, the strip 3 is resistant to corrosion and chemical attacks, differently to the internal metal tension rods of the prior art. The strip further has an impermeabilisation function. The production process in the prefabrication sites is largely simplified as the post-tensioning and production steps of the structural element 1 are simpler.

The invention as it is conceived is susceptible to numerous modifications and variants, all falling within the scope of the inventive concept characterising it. Further, all the details can be replaced with other technically-equivalent elements. In practice, all the materials used, as well as the dimensions, can be any according to requirements.

The invention claimed is:

1. A structural element for constructions comprising a structure (2) made of concrete and/or geopolymer and/or alkali activated material;
    characterised in that it comprises at least one tensioned strip (3) made of a fibre-resin composite which:
        surrounds said structure (2), compressing said structure;
        at least partly surmounts an external surface (20) of said structure (2);
    said strip comprises a plurality of superposed layers (30) made of a fibre-resin composite which surround the structure (2); a more external layer being connected to a more internal layer without external means for maintaining a tension of said strip (30).

2. The element according to claim 1, characterised in that said strip (3) comprises two flaps (21) which surmount one another and which adhere by gluing.

3. The element according to claim 1, characterised in that the fibre comprises a plurality of filaments; the filaments extending flanked to one another, not intertwined to form a warp and a weft.

4. The element according to claim 1, characterised in that said layers (30) are superposed on one another, the more external layer being glued to the more internal layer without external means for maintaining a tension of said strip (30).

5. The element according to claim 1, characterised in that the fibre-resin composite defines a barrier having a low permeability to water.

6. The element according to claim 1, characterised in that it comprises one or more sheets (4) of an organic polymer interposed between two superposed zones of said strip for improving impermeabilization to water.

7. The element according to claim 1, characterised in that said fibre is a glass fibre or a carbon fibre or a basalt fibre.

* * * * *